United States Patent [19]

Berghahn et al.

[11] E Re. 31,101

[45] Reissued Dec. 14, 1982

[54] CHILD RESISTANT PACKAGE

[75] Inventors: Walter G. Berghahn; Martha L. Berghahn, both of Scotch Plains, N.J.

[73] Assignee: Bristol-Myers Company, New York, N.Y.

[21] Appl. No.: 229,686

[22] Filed: Jan. 29, 1981

Related U.S. Patent Documents

Reissue of:

[64] Patent No.: 4,109,785
Issued: Aug. 29, 1978
Appl. No.: 853,609
Filed: Nov. 21, 1977

[51] Int. Cl.[3] ..... A45C 13/10; A45C 13/18

[52] U.S. Cl. ..... 206/1.5; 215/211; 220/307

[58] Field of Search ..... 215/211, 224, 225; 206/105; 220/307

[56] References Cited

U.S. PATENT DOCUMENTS

| | | | |
|---|---|---|---|
| 3,399,764 | 9/1968 | Rigor | 206/1.5 |
| 3,554,366 | 1/1971 | Corll | 206/42 |
| 3,698,543 | 10/1972 | Trotta | 206/42 |
| 3,844,407 | 10/1974 | Buie | 206/1.5 |

FOREIGN PATENT DOCUMENTS

| | | |
|---|---|---|
| 380255 | 9/1932 | United Kingdom . |
| 404315 | 1/1934 | United Kingdom . |
| 626415 | 7/1949 | United Kingdom . |
| 735994 | 8/1955 | United Kingdom . |
| 1080005 | 8/1967 | United Kingdom . |
| 1162357 | 8/1969 | United Kingdom . |
| 1237542 | 6/1971 | United Kingdom . |
| 1288392 | 9/1972 | United Kingdom . |
| 1303049 | 1/1973 | United Kingdom . |
| 1355162 | 6/1974 | United Kingdom . |
| 1397121 | 6/1975 | United Kingdom . |
| 1443882 | 7/1976 | United Kingdom . |

*Primary Examiner*—George T. Hall
*Attorney, Agent, or Firm*—Irving Holtzman; George A. Mentis

[57] ABSTRACT

A child resistant package is provided which comprises a container body and removable cap. The cap is only removable by applying pressure to the underside of the cap. Access to the underside of the cap is had through a channel which is longer than the length of the finger of an average child but not longer than the length of the finger of an adult.

14 Claims, 15 Drawing Figures

CHILD RESISTANT PACKAGE

Matter enclosed in heavy brackets [ ] appears in the original patent but forms no part of this reissue specification; matter printed in italics indicates the additions made by reissue.

This invention relates to child resistant packages. More particularly, it concerns packages that are especially useful in storing and dispensing medicinal tablets, capsules, etc. that are essentially child resistant and yet are readily openable by adults who are infirm, as for example, in the case of arthritics.

Many suggestions appear in the prior art for child proof safety packages for storing and dispensing medicinal tablets, pills, capsules and the like. These have taken a variety of forms usually involving the manipulation and turning of a cap that is positioned on top of a bottle. Typical caps of this character have been disclosed in U.S. Pat. Nos.: 3,627,160; 2,953,271; 3,472,410; 3,393,816 and 3,628,680. Other types of safety closure bottles are shown in U.S. Pat. Nos. 3,980,193 and 3,170,585.

Safety closures of the prior art, in general, have suffered from at least two disadvantages. Firstly, adults with conditions like arthritis of the hands have found it somewhat difficult to manipulate and to remove the caps from these containers. Secondly, over a period of time, children for whom these packages are supposed to offer protection, seem to learn how to remove the caps.

It has now been found that highly effective child resistant packages may be provided for packing and dispensing tablets, pills, capsules and the like from which the caps are readily removable by persons who have limited use of the hands by a construction which permits the removal of the caps by pressure applied by a finger to the underside of the cap. Access is obtained to the underside of the cap by means of a channel in the container which is large enough to accommodate a finger. In the preferred case, this channel is essentially centrally disposed. The length of the channel i.e. the distance from the entrance opening in the channel to the underside of the cap, (or an extension of the underside of the cap), is such that it is greater than the average length of the finger of a child. Because of this, a child is not able to remove the cap of the container. As used herein, the term "child" is employed to mean a child up to about 4 years and 4 months.

Several safety devices and containers are known in the prior art that take advantage of the difference in the average length between adult and children fingers. For example, U.S. Pat. No. 3,554,366 discloses a child safe container comprising a passageway that is longer than a child's finger and an actuator means at the end of the passageway for opening a sliding partition to permit the dispensing of the contents of the container. Removal of the finger causes the actuator means to go back into the closed position. However, there is no suggestion in this reference of the present concept of using the passageway as means for gaining access to the bottom of a cap that is then easily popped off by applying a little pressure thereto.

U.S. Pat. No. 3,698,543 is a somewhat similar concept to the teaching in U.S. Pat. No. 3,554,366. This, however, is concerned more with an aerosol container where the passageway to the actuator button is made longer than the average child's finger. U.S. Pat. No. 1,828,698 also shows a somewhat similar device. In this case, the passage leads to an actuator that releases a spring that makes it possible to open a match box. In neither of the latter two patents is the concept of the present invention disclosed.

It is accordingly an object of the present invention to provide a child resistant container for storing and dispensing tablets, pills, capsules and the like having a cap which is readily popped off by application of pressure to the underside of the cap; access to the underside of said cap, or an extension thereof, being obtained through a channel whose length is generally longer than that of the average child's finger.

Other and more detailed objects of this invention will be apparent from the following description, claims and drawings wherein:

Figure 1:
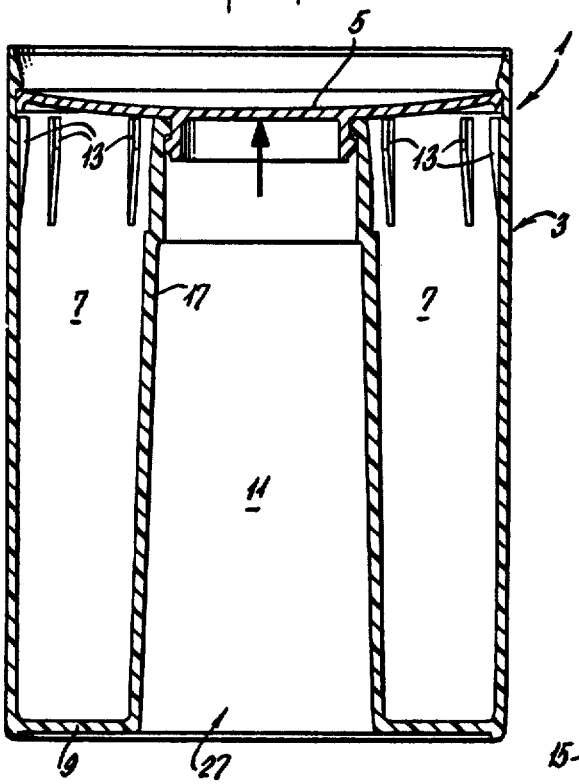
FIG. 1 is a longitudinal cross-sectional view of a container embodied in the present invention with the cap of the container in a closed dished-in sealed position.

Referring now to the drawings in which like numerals designate the same structure in the various views, 1 designates generally the embodiment shown in FIG. 1 and consists of a container body 3 and cap 5. Container body 3 comprises a product carrying portion 7 that is closed at the bottom by bottom wall 9 and open at the top to allow for filling of the product carrying portion 7 with materials such as tablets, pills, capsules, etc.

Product carrying portion 7 surrounds a channel 11 that is open at the bottom and the top. Channel 11 is dimensioned so that an adult finger can be introduced at the bottom of the channel and reach the top of the channel. Product carrying portion 7 of the container is preferably, but not necessarily, circular in cross-section thus forming an annular container closed at the bottom and open at the top. In this case, channel 11 will be circular in cross-section. However, this can of course vary without departing from this invention. Thus, for example, the outer configuration of the container may be rectangular or square in outline; whereas, the channel 11 might be circular in cross-section. Similarly, both the outer configuration of the container and channel 11 might both be rectangular or square in cross-section.

Near the upper end container body 3 and on the inner surface of its outside wall, there is provided a plurality of spaced supports 13. These serve to support cap 5 in a fashion described in more detail below.

Figure 3:
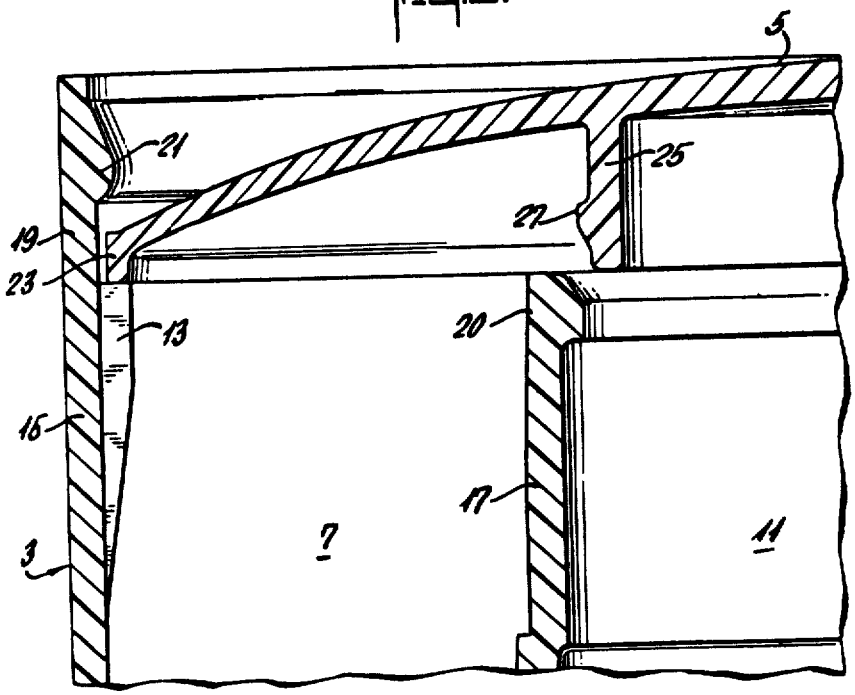
FIG. 3 is a partial enlarged view similar to that shown in FIG. 2 showing the details of the sealing arrangement.

As best seen in FIG. 3, outer wall 15 of container body 3 is longer than the inner wall 17 of said container body 3. Outer wall 15 is thus provided with an upper extension 19 that begins at the upper level of support 13 and extends to the upper margin of outer wall 15. Extension 19 is provided on its inner surface with sealing bead 21 whose function will be described in more detail below.

Located at the upper end of inner wall 17 of the container body 3 and on the inner surface thereof, there is provided a sealing and locking bead 20. This will serve to cooperate with bead 27 on cap 5 in a manner described in more detail below.

Container body 3 can be fabricated from any suitable material. It may be made of such materials as polystyrene, modified polystyrene, high density polyethylene, polypropylene, copolymers of polypropylene, etc.

Cap 5 may have any of a variety of configurations. However, it will preferably take the form of an arcuate circular disc whose normal surface curvature is convex upwardly. This curvature is subject to being changed by applying pressure to the upper surface of the disc whereby it is turned downwardly into a concave position. The outer margin of cap 5 terminates in an annular member 23, best seen in FIG. 3, that is generally rectangular in cross-section. This is adapted to be deformed outwardly when cap 5 is pressed inwardly as described below.

As annular skirt 25 is also provided that depends from the undersurface of cap 5 and is preferably made integral therewith. Skirt 25 is centrally disposed on the undersurface of cap 5 and is provided on its lower outer surface with a sealing and locking bead 27 designed to engage a corresponding bead 20 of container body 3.

Cap 5 may be made of any suitable flexible material that is capable of being formed into an arcuate disc whose direction of curvature can be changed by applying pressure at about the center of the disc. Furthermore, it is preferably made of material which can form a tight seal with the container when it is pushed into its dished-in position. A variety of materials are known in the prior art which are suitable for these purposes. However, it is preferred that cap 5 be made of such materials as high or low density polyethylene, polypropylene, copolymers of polypropylene, etc.

A critical feature of the present invention is length of channel 11. This is made sufficiently long so that if an average child, as defined above, were to insert its finger into channel 11 through opening 27, it would not be able to reach the underside of cap 5 when it is in the position shown in FIG. 1. This length of channel 11 may vary somewhat. It has been found, however, that for most purposes if channel 11 is between about 2.25 to about 2.75 inches in length, this would be adequate to make it impossible for a child to reach cap 5 with its finger. By the same token, the width or diameter of channel 11 is not made large enough so that a child could put its hand into this channel.

To apply the cap 5 to the container body 3 of the present invention, the cap is first positioned on the container so that annular member 23 rests on supports 13. Finger pressure is then applied at the center of the upper surface of cap 5 and the cap is pressed home. This causes cap 5 to dish inwardly and come to the position shown in FIG. 1. Locking and sealing bead 27 also comes down to engage bead 20 from below. At the same time, annular member 23 becomes deformed outwardly somewhat and engages bead 21 from below. The latter forms a tight seal that serves to protect the contents of the container body 3 from the atmosphere. This is important for some applications of the present invention such as the packaging of aspirin containing products.

When the adult wishes to get at the contents of the container of FIG. 1, he simply inserts his finger into channel 11 through opening 27 and pushes it upwardly until it engages the underside of cap 5. By applying pressure upwardly, the adult can pop the cap off and thereby get at the contents of the container.

The force required to pop off cap 5 can be controlled by the relative diameters of locking and sealing bead 27 on cap 5 and the corresponding bead 20 located on inner wall 27. The greater the interference between these diameters, the greater will be the force required to pop off cap 5.

It is a feature of this invention to provide a container that is essentially moisture-proof i.e. one which will seal the contents of the container from the moisture of the atmosphere. This is important for many applications of the present invention. This is accomplished in the instant invention by means of a double moisture seal. Thus, the locking arrangement that is effected by beads 27 and 20 does not only serve to lock cap 5 on to container body 3 but also serves as a moisture seal. In addition, when cap 5 is pressed home into its closed position, annular member 23 forms a moisture seal with bead 21 as described above. In other modifications that will be described in more detail below this seal is made between annular member 23 and the inner surface of extension 19.

Figure 4:
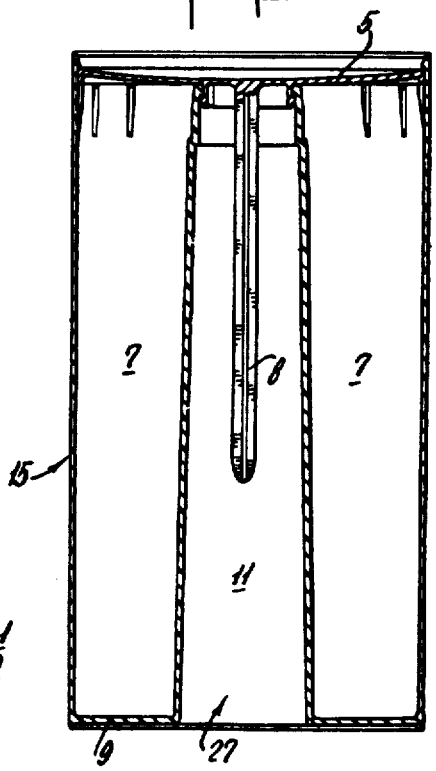
FIG. 4 is a longitudinal cross-sectional view of another embodiment of the present invention showing a larger size container and an extension from the undersurface of the cap to make possible the removal of the cap from the larger size container.

FIG. 4 shows another modification of the present invention designed particularly for larger capacity containers. In this case, channel 11 may be too long for even an adult finger to reach the underside of cap 5. There is accordingly provided a cap extension 8 that depends from the underside of cap 5 and is preferably made integral therewith. Extension 8 may take a variety of forms. All that is required of it is that it be long enough so that its inner end may be reached by an adult finger that is inserted into channel 11 and that it be rigid enough so that when finger pressure is applied at its inner end, the force is transmitted to the underside of cap 5 and cap 5 is thus popped off. In the modification illustrated in FIG. 4, cap extension 8 is shaped as two planar elements that intersect each other at right angles. Accordingly, in cross-section any place along its length, cap extension 8 appears as a cross.

Figure 7:
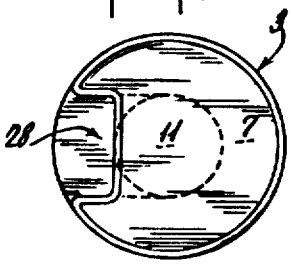
FIG. 7 is a bottom plan view of the container shown in FIG. 5.
Figure 6:
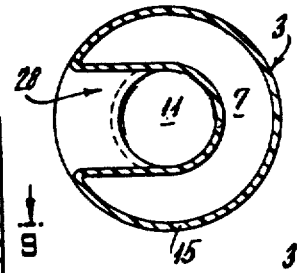
FIG. 6 is a horizontal cross-sectional view taken along lines 6—6 of the container shown in FIG. 5.
Figure 5:
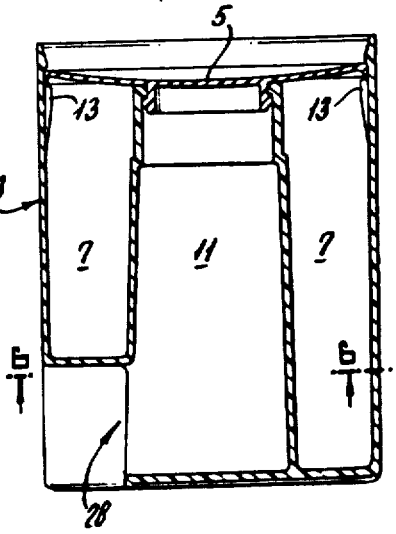
FIG. 5 is a longitudinal cross-sectional view of another embodiment of the present invention in which access to the central channel is obtained through an opening in the lower side wall of the container.

Another modification of this invention is shown in FIGS. 5, 6 and 7 of the drawings. In this case, instead of a centrally disposed opening 27 that opens into channel 11, there is provided a channel 28 located at the bottom and side of container body 3. In this embodiment of the invention to reach the underside of cap 5, the finger is introduced into channel 28 and then must be bent in order to pass up through channel 11 to reach the underside of cap 5. This has an advantage in that if a child was to introduce a straight instrument such as a pencil into channel 28 in an effort to remove cap 5, he could not reach it.

Figure 8:
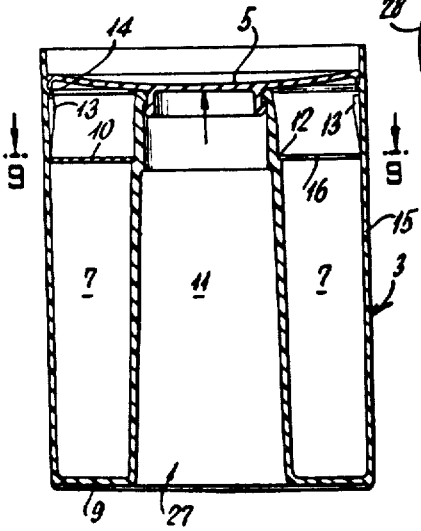
FIG. 8 is a longitudinal cross-sectional view of another modification of this invention.
Figure 9:
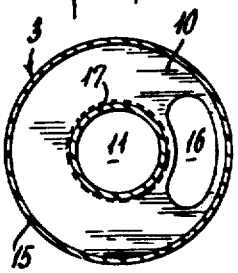
FIG. 9 is a horizontal cross-sectional view of the modification shown in FIG. 8 taken along line 9—9.

FIGS. 8 and 9 illustrate still another embodiment of this invention. This is very much like the modification shown in FIGS. 1 to 3 but has some additional features.

Figure 2:
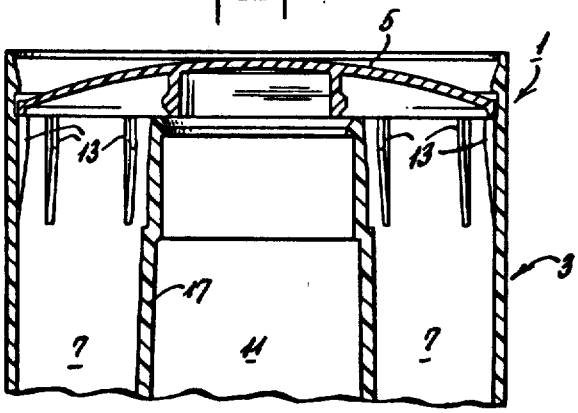
FIG. 2 is a partial view similar to that shown in FIG. 1 showing the cap in a partially open, dished-out position ready for removal.

In this embodiment, bead 21, shown in the modification of FIGS. 1 to 3 has been eliminated. In this case, when cap 5 is dished inwardly, a seal is formed between the inner wall of extension 19 and annular member 23 of cap 5.

Another feature of change in this embodiment is the provision of continuous support member 14 in place of the spaced support members 13. Support member 14 is formed as an internal bead on the inner surface of extension 19 and is preferably integral therewith. This is formed so that it sits upon and is also integral with the spaced support members 13. In this case spaced support members 13 serve to support bead 14 and to give some rigidity to the container wall.

An additional feature of the embodiment of this invention shown in FIGS. 8 and 9 is the provision of a removable separator member 10 which serves to partially close off the lower part of product carrying portion 7 of the container body 3. Separator member 10 is supported on a lip 12 cut into the surface of wall 17. The product (e.g. tablets) are maintained in container body 3 by separator 10. A hole 16 is cut into separator 10 to provide a means for dispensing a limited number of tablets, pills, etc. at a time from product carrying portion 7.

Figure 12:
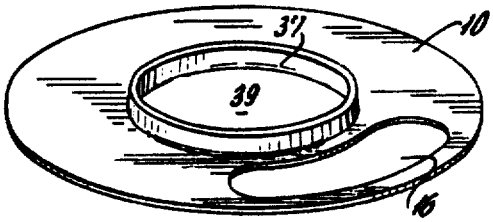
FIG. 12 is a perspective view of the separator member shown in FIG. 11.
Figure 10:
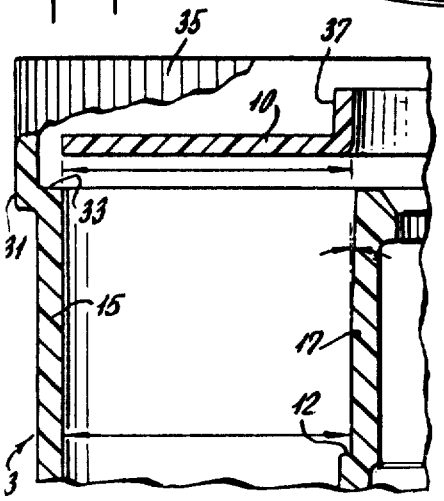
FIG. 10 is a partial longitudinal cross-sectional view of another modification of this invention with the cap removed and showing the separator member in its unassembled position.

Another modification of this invention is illustrated in FIGS. 10 and 12 of the drawings. Cap 5 is not shown in position in this modification in order to make clearer other unique features of this modification. It is to be understood, however, that cap 5 shown in FIGS. 1 to 3 or FIG. 8 is also a part of the modification of the invention shown in FIGS. 10 to 12 and has the same construction and characteristics.

Figure 11:
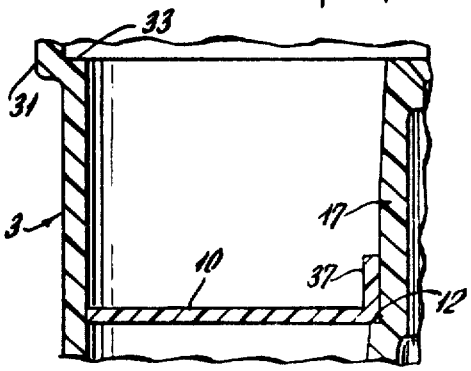
FIG. 11 is a view similar to that shown in FIG. 10 in which the separator member is shown seated on its supporting lip.

The modification of this invention shown in FIGS. 10 to 12 differs from the modifications shown in FIGS. 1 to 3 or FIGS. 8 and 9 essentially only in the construction of the upper neck portion of the container body 3 and the design of the separator member 10. In this modification, the upper portion of outside wall 15 of container body 3 is formed into an offset portion 31. This has a hoop-like, sturdy thickness and construction which resists deformation inwardly when pressure is applied to the circumference of offset portion 31.

Adjacent the lower end of offset portion 31 and disposed inwardly thereof there is provided a lip 33. This serves to support cap 5 when the latter is seated on the container body shown in this modification. The outer surface of offset portion 31 is knurled as shown at 35 to simulate the appearance of a screw cap.

Separator member 10 of this modification as best shown in FIG. 12 is constructed in a manner somewhat similar to that shown in the modification depicted in FIGS. 8 and 9. As in the latter case, separator 10 of this modification is also provided with a dispensing hole 16 for dispensing tablets, pills, etc. and a central opening 39. However, it is also provided with an upwardly extending collar 37 that is preferably tapered upwardly and inwardly. The positioning of separator 10, just before it is mounted on container body 3, is shown in FIG. 10. Separator 10 is then positioned so that its central opening 39 slides over the upper extremity of inner wall 17 of container body 3. Separator 10 is then wedged downwardly until it comes to rest on lip 12. The position of separator 10 when it comes to rest is best seen in FIG. 11.

Thus, the modification of this invention as shown in FIGS. 10 and 12 has several special safety features. The first, as indicated above, is the hoop-like element 31. This is constructed so that it is sufficiently thick and inflexible so that pressure on the circumference will not readily cause the container neck to collapse. This serves to further insure that a child will not dislodge the cap by squeezing the neck until the cap is forced out.

The knurled surface 35 of offset portion 31 is also a further safety feature in that it is designed to simulate a screw cap. This is intended to trick the child into thinking that offset portion 31 is a screw cap to be removed by unscrewing it. This could keep the child busy and perhaps distract it from trying other means for removing the cap.

As indicated above, the tapered construction of collar 37 of separator 10 of this modification requires that separator 10 be wedged onto the inner wall 17 of the container body 3. This forms a tight friction fit between the separator 10 and inner wall 17. This is significant from safety point of view in that if the child were to invert the container with the cap facing downwardly and bang it on the table, the force of the movement of the contents of the container would not impinge against the underside of the cap and therefore dislodge it. It would rather be dissipated against the underside of separator 10.

Opening 16 in separator 10 particularly in the modification illustrated in FIGS. 10 to 12 has still a further safety feature. Besides serving as a opening through which the contents of the container may be dispensed, it also restricts the number of tablets, for example, that will be dispensed at any one time. Thus, for example, if a child were to remove the cap it would still be confronted with separator 10. All of the contents of the container would not be immediately available to the child but only so many as could be dispensed at one time. This would serve to reduce the number of tablets that a child would take at any one time and reduce the chances of it taking a lethal dose.

Figure 15:
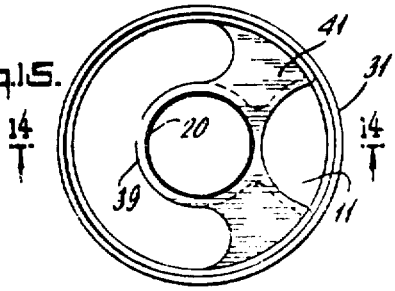
FIG. 15 is a top plan view of the modification of this invention shown in FIG. 14 with the cap removed.
Figure 13:
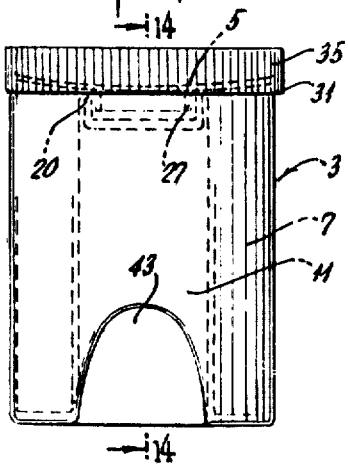
FIG. 13 is a perspective view of another modification of this invention.
Figure 14:
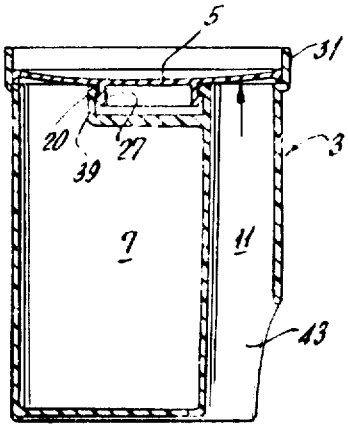
FIG. 14 is a longitudinal cross-sectional view of the modification shown taken along line 14—14 of FIG. 14.

The modification of this invention illustrated in FIGS. 13 to 15 is somewhat similar to the modification shown in FIGS. 5 to 6. In this modification, however, the channel 11 through which access is gained to the underside of cap 5 to pop the latter off is not centrally disposed but is disposed to one side of the container. There is also provided a cylindrical element 39, closed at the bottom, which serves to carry bead 20 that will engage the corresponding locking and sealing bead 27 of cap 5. Cylindrical element 39 is supported along one of its sides and is integral with the inner portion of channel 11. Further support for cylindrical element 39 is afforded by web 41 that extends outwardly from cylindrical element 39 to the inner surface wall of the container. This is best seen in FIG. 15.

In using the modification of this invention shown in FIGS. 13 to 15, the tablets, pills or the like are loaded into the product carrying portion 7 of the container.

Cap 5 is then placed on the container and the cap is pushed home in a manner described above. To remove the cap, the adult finger is introduced into channel 11 through opening 43 and it is moved up until it engages the underside of cap 5. The point at which pressure is applied to the cap in this case is at the arrow as best seen in FIG. 14. As in the other modifications of this invention, the distance from the opening into channel 11 to the underside of cap 5 when the latter is in its closed position is greater than the average length of a child's finger as defined herein.

What is claimed is:

1. A child resistant package comprising in combination a container body *having an upper free margin* and removable cap means *having an upper surface*; said container body being open at the top and being provided with a closed bottom and outer side wall;

support means on said container body for supporting said cap means *below said upper free margin of said container body* when positioned on said container body *whereby said upper surface of said cap means is spaced below said upper free margin of said container;* a passageway through said body having an opening to the outside of said container body and extending from a point on an outside wall thereof remote from said cap to a point adjacent said cap means whereby access may be had to said cap means from outside said container body through said passageway;

said passageway being wide enough to just about accommodate an average adult finger but longer than the average child's finger;

the distance from said passage opening to the point on the cap means on which pressure may be applied to pop the cap means off the container being longer than the average child's finger but about as long as an average adult finger.

2. A child resistant package according to claim 1 in which the removable cap means includes an extension that extends downwardly from the undersurface of the cap and is positioned inside said passageway when said cap is positioned on said container body, whereby said cap means may be popped off by applying pressure to said extension.

3. A child resistant package according to claim 1 in which said passageway is centrally disposed along the long axis of said container body, said passageway opening at the bottom of said container body and extending to the op of said container body.

4. A child resistant package according to claim 1 in which said passageway has a vertically extending component that extends to the top of the container body and an angular component that communicates with said vertically extending component, said angular component at least partially having an opening in said outer side wall.

5. A child resistant package according to claim 1 in which said cap comprises an arcuate flexible disc which is generally convex upwardly, said disc being adapted to be pressed inwardly when positioned on said container body to change its contour so that it is concave downwardly.

6. A child resistant package according to claim 5 in which said flexible cap is provided with a downwardly disposed extension that extends into said passageway.

7. A child resistant package comprising in combination a container body and removable flexible cap means;

said container body being open at the top and closed at the bottom and formed around a vertically extending passageway which is open at the top and bottom;

said container body being provided with inner and outer walls each having inner and outer surfaces;

said outer wall also being provided on its inner surface with support means for said cap;

said flexible cap means being arcuate in shape and convex upwardly and being provided around its outer margin with a deformable member, said flexible cap means being adapted to be seated on said support means and flexed inwardly into a dished-in position by applying pressure to its top surface; and said pressure also deforming said deformable member outwardly whereby an air tight seal is formed between said deformable member and the inner surface of said outer container wall.

8. A child resistant package according to claim 7 in which said cap is provided with a downwardly extending skirt having an outer surface on which located near its lower margin is a first locking and sealing bead;

the inner surface of the inner wall of said container body being provided with a second locking and sealing bead near its upper end;

said first bead being adapted to engage said second bead from below when said cap is flexed inwardly into a closed position.

9. A child resistant package according to claim 8 in which said container body is circular in cross-section and said cap is disc shaped.

10. A child resistant package according to claim 9 wherein said outer wall of said container body adjacent its upper end is adapted to resist deformation inwardly when pressure is applied to said outer wall in the area adjacent its upper end.

11. A child resistant package according to claim 10 wherein the outer surface of said outer wall in the region adjacent its upper end is designed to simulate the surface of a removable cap.

12. A child resistant package according to claim 7 including a separator provided with a dispensing opening cut therethrough, said separator being positioned and removably supported between said inner surface of said outer wall and said outer surface of said inner wall at the upper portion of said container body.

13. A child resistant package according to claim 12 in which said separator is supported on a lip cut into the outer surface of said inner wall and said separator is provided with an upwardly extending collar that tapers upwardly and inwardly whereby when the separator is placed in position in the container, it is wedged downwardly and rests on said lip.

*14. A child resistant package comprising in combination a container body having inner and outer walls with inner and outer surfaces and removable cap means; said container body being open at the top and being provided with a closed bottom;*

*support means on said container body for supporting said cap means when positioned on said container body;*

*a passageway through said body having an opening to the outside of said container body and extending from a point on an outside wall thereof remote from said cap to a point adjacent said cap means whereby access may be had to said cap means from outside said container body through said passageway;*

*said passageway being wide enough to just about accommodate an average adult finger but longer than the average child's finger;*

*the distance from said passage opening to the point on the cap means on which pressure may be applied to pop the cap means off the container being longer than the average child's finger but about as long as an average adult finger;*

*said package including a separator provided with a dispensing opening cut therethrough, said separator being positioned and removably supported between said inner surface of said outer wall and said outer surface of said inner wall at the upper portion of said container body.*

* * * * *